US010647608B2

(12) United States Patent
Kohara et al.

(10) Patent No.: US 10,647,608 B2
(45) Date of Patent: May 12, 2020

(54) FLUORINATED TIN-BASED GLASS FRIT AND METHOD FOR MANUFACTURING SAME

(71) Applicant: YEJ GLASS Co., Ltd., Kagoshima (JP)

(72) Inventors: Yoshihiro Kohara, Kagoshima (JP); Yoshinari Takao, Kagoshima (JP); Seungwoo Lee, Seoul (KR)

(73) Assignee: YEJ GLASS Co., Ltd. (JP)

( * ) Notice: Subject to any disclaimer, the term of this patent is extended or adjusted under 35 U.S.C. 154(b) by 0 days.

(21) Appl. No.: 16/066,934

(22) PCT Filed: Jan. 8, 2016

(86) PCT No.: PCT/JP2016/050564
§ 371 (c)(1),
(2) Date: Jun. 28, 2018

(87) PCT Pub. No.: WO2017/119131
PCT Pub. Date: Jul. 13, 2017

(65) Prior Publication Data
US 2019/0010080 A1 Jan. 10, 2019

(51) Int. Cl.
*C03C 8/08* (2006.01)
*C03C 8/14* (2006.01)
*C03C 8/24* (2006.01)
*C03C 3/062* (2006.01)
*C03C 3/247* (2006.01)

(52) U.S. Cl.
CPC .............. *C03C 8/08* (2013.01); *C03C 3/062* (2013.01); *C03C 3/247* (2013.01); *C03C 8/14* (2013.01); *C03C 8/24* (2013.01)

(58) Field of Classification Search
CPC .......... C03C 8/08; C03C 3/247; C03C 3/062; C03C 3/16
See application file for complete search history.

(56) References Cited

U.S. PATENT DOCUMENTS

| 2007/0189916 A1* | 8/2007 | Zhang | C22C 5/04 419/66 |
| 2008/0146431 A1* | 6/2008 | Aitken | C03C 3/247 501/44 |
| 2014/0291617 A1* | 10/2014 | Kim | H01L 51/56 257/40 |
| 2014/0312313 A1* | 10/2014 | Lee | H01L 51/5237 257/40 |
| 2014/0322851 A1* | 10/2014 | Kim | C23C 14/086 438/46 |
| 2015/0031153 A1* | 1/2015 | Sin | C23C 24/10 438/28 |
| 2016/0093826 A1* | 3/2016 | Lee | H01L 51/5243 257/40 |

FOREIGN PATENT DOCUMENTS

| JP | H09235136 A | 9/1997 |
| JP | 2000169183 A | 6/2000 |
| JP | 2001048579 A | 2/2001 |
| JP | 2004010405 A | 1/2004 |
| JP | 2007001817 A | 1/2007 |
| JP | 2008037740 A | 2/2008 |
| JP | 2010505727 A | 2/2010 |
| JP | 2011225404 A | 11/2011 |

* cited by examiner

*Primary Examiner* — Noah S Wiese
(74) *Attorney, Agent, or Firm* — St. Onge Steward Johnston & Reens LLC

(57) ABSTRACT

Provided is a super low melting SnO—SnF2—P2O5-based glass frit for which the firing temperature can be set to 200° C. or less and which has high water resistance and transparency. The fluorinated tin-based glass frit includes, in mol %, 30 to 70% of SnF2, 10 to 30% of P2O5, 10 to 40% of SnO, 0.1 to 10% of SnO2, 0 to 5% of In2O3, 0 to 5% of B2O3, and 0 to 5% of SiO2, and has a glass transition point of 160° C. or lower, a softening point of 180° C. or lower, and a maximum particle size of 100 μm or less. The fluorinated tin-based glass frit has a visible light transmission rate of 80% or more at 200° C. and a thickness of 0.6 mm of a fired product thereof, and a rate of volume reduction of the fired product due to soaking in hot water at 85° C. for 24 hours is 2 vol. % or less.

5 Claims, No Drawings

FLUORINATED TIN-BASED GLASS FRIT AND METHOD FOR MANUFACTURING SAME

FIELD OF THE INVENTION

The present invention relates to a fluorinated tin-based glass frit, suitable as a sealing material and coating material for various display panels, solar cell panels, and various electronic parts and optical parts, etc., and a method for manufacturing the glass frit.

BACKGROUND OF THE INVENTION

Although glass frits of diverse compositions have been used from before as sealing glass materials, those which, for reduction of environmental load, do not contain a lead component and are of low melting property to enable a firing temperature to be set low to suppress adverse thermal effects on an object to be sealed and an incorporated element thereof, etc., are being regarded as useful in recent years. Tin phosphate-based glass (for example, Patent Literatures 1 and 2) is representative of such low-melting, lead-free glass, and it has also been proposed that its main components of SnO and $P_2O_5$ be further added with $B_2O_3$ (Patent Literature 3), $SiO_2$ (Patent Literature 4), ZnO (Patent Literature 5), $Y_2O_3$ (Patent Literature 6), etc., as a principal component or trace component to improve various glass characteristics, such as sealing strength, glass strength, weather resistance, moisture resistance, durability, etc. However, even though such conventional tin phosphate-based glass frits are low melting, the firing temperature for sealing is still approximately 400 to 480° C. and there is a demand for a glass frit that can be fired at an even lower temperature to improve sealing workability.

$SnO$—$SnF_2$—$P_2O_5$-based glass is known as a lead-free glass of lower melting property that can answer the above demand. For example, in Patent Literature 7 is proposed a tin fluorophosphate material with which, in element ratios, Sn: 20 to 85 weight %, P: 2 to 20 weight %, O: 10 to 30 weight %, F: 10 to 36 weight %, Nb: 0 to 5 weight %, and Sn+P+O+F is 75 weight % or more. Also, in Patent Literature 8 is proposed a tin fluorophosphates material with a glass transition temperature lower than 160° C. and with which, as element ratios, Sn: 55 to 75 weight %, P: 4 to 14 weight %, O: 6 to 24 weight %, F: 4 to 22 weight %, W: 0.4 to 15 weight %.

CITATION LIST

Patent Literature

Patent Literature 1: Japanese Published Unexamined Patent Application No. H09-235136
Patent Literature 2: Japanese Published Unexamined Patent Application No. 2008-037740
Patent Literature 3: Japanese Published Unexamined Patent Application No. 2000-169183
Patent Literature 4: Japanese Published Unexamined Patent Application No. 2001-048579
Patent Literature 5: Japanese Published Unexamined Patent Application No. 2011-225404
Patent Literature 6: Japanese Published Unexamined Patent Application No. 2004-010405
Patent Literature 7: Japanese Translation of International Application (Kohyo) No. 2007-001817
Patent Literature 8: Japanese Translation of International Application (Kohyo) No. 2010-505727

SUMMARY OF THE INVENTION

However, generally with the conventional $SnO$—$SnF_2$—$P_2O_5$-based glass frit, there are problems in that when the proportion of $SnF_2$ or $P_2O_5$ is increased to realize a low melting property, the water resistance decreases and, for example, when an object, such as an organic EL display, that contains a moisture-intolerant functional element in its interior is the object to be sealed, the proportion of SnO must be made high to secure water resistance and because the proportions of $SnF_2$ and $P_2O_5$ are thereby decreased relatively, the firing temperature must be set to 250° C. or higher, and also, whereas when the fired product is a thin film of approximately several μm, it is colorless and transparent, decrease in transparency and coloration occur in the case of a thick film of 100 μm or more.

In view of the foregoing circumstances, the present invention aims at providing a fluorinated tin-based glass frit, which, although being a super low melting $SnO$—$SnF_2$—$P_2O_5$-based glass that enables the firing temperature to be set to 200° C. or lower, has excellent water resistance and transparency, and a method for manufacturing the glass frit.

In order to achieve the above objects, a fluorinated tin-based glass frit according to the first aspect of the present invention includes, in mol %, 30 to 70% of $SnF_2$, 10 to 30% of $P_2O_5$, 10 to 40% of SnO, 0.1 to 10% of $SnO_2$, 0 to 5% of $In_2O_3$, 0 to 5% of $B_2O_3$, and 0 to 5% of $SiO_2$, and has a glass transition point of 160° C. or lower, a softening point of 180° C. or lower, and a maximum particle size of 100 μm or less, a visible light transmission rate of a fired product obtained at 200° C. is 80% or more at a thickness of 0.6 mm, and a rate of volume reduction of the fired product due to soaking in hot water at 85° C. for 24 hours is 2 vol. % or less.

The second aspect of the present invention is such that the fluorinated tin-based glass frit according to the first aspect includes, in mol %, 40 to 65% of $SnF_2$, 15 to 30% of $P_2O_5$, 15 to 40% of SnO, 0.1 to 2% of $SnO_2$, 0 to 5% of $In_2O_3$, 0 to 5% of $B_2O_3$, and 0 to 5% of $SiO_2$.

A method for manufacturing a fluorinated tin-based glass frit according to the third aspect of the present invention includes the steps of mixing a glass raw material powder, which includes, in mol %, 30 to 70% of $SnF_2$, 10 to 30% of $P_2O_5$, 10 to 40% of SnO, 0.1 to 10% of $SnO_2$, 0 to 5% of $In_2O_3$, 0 to 5% of $B_2O_3$, and 0 to 5% of $SiO_2$, with a powder of an aromatic carboxylic acid, vitrifying the mixture by heating and melting it at 500° C. or lower, and thereafter pulverizing the mixture.

The fourth aspect of the present invention is configured such that in the method for manufacturing the fluorinated tin-based glass frit according to the third aspect, 100 parts by weight of the glass raw material powder is mixed with 0.5 to 2.5 parts by weight of the powder of the aromatic carboxylic acid.

The fifth aspect of the present invention is configured such that in the method for manufacturing the fluorinated tin-based glass frit according to the third aspect, the aromatic carboxylic acid is at least one type selected from among an aromatic monocarboxylic acid, an aromatic dicarboxylic acid, an aromatic dicarboxylic acid anhydride, and a mono or dialkyl ester of an aromatic dicarboxylic acid.

The fluorinated tin-based glass frit according to the first aspect of the present invention, due to including $SnF_2$, $P_2O_5$, SnO, and $SnO_2$ at specific proportions and being extremely low in glass transition point and softening point and thus being super low melting, provides good fluidity, is thus excellent in sealing workability, can reliably prevent adverse thermal effects on an object to be sealed and an incorporated element thereof, etc., and moreover is such that a sealing glass layer is colorless and transparent, exhibits high optical transparency, and is excellent in water resistance such that even an object, such as an organic EL display, that contains a moisture-intolerant functional element in its interior can be made an object to be sealed without any problem whatsoever.

According to the second aspect of the present invention, by having a further restricted glass composition as the fluorinated tin-based glass frit, the respective actions and effects can be exhibited more reliably.

According to the third aspect of the present invention, due to mixing the specific glass raw material powder with the powder of the aromatic carboxylic acid and then melting and vitrifying, the fluorinated tin-based glass frit, which is super low melting such as to enable the firing temperature to be set to 200° C. or lower and enables the forming of a sealing glass layer that is excellent in optical transparency and water resistance, can be manufactured easily.

According to the fourth aspect of the present invention, due to mixing the powder of the aromatic carboxylic acid at a specific proportion with respect to the glass raw material powder, the above-described excellent fluorinated tin-based glass frit can be manufactured reliably.

According to the fifth aspect of the present invention, due to using the specific aromatic carboxylic acid, the above-described excellent fluorinated tin-based glass frit can be manufactured more reliably.

The fluorinated tin-based glass frit according to the present invention basically has a four-component system glass composition of $SnF_2$—SnO—$P_2O_5$—$SnO_2$ and may contain, in addition to the four essential components, $In_2O$, $B_2O_3$, and $SiO_2$ as optional components, and, by the respective components being of specific proportions, exhibits good fluidity even at a firing temperature of 200° C. or lower due to being extremely low in glass transition point and softening point and thus being super low melting, provides excellent sealability and high sealing strength, and is such that a sealing glass layer has high optical transparency and water resistance.

That is, the glass composition of the present glass frit includes, in mol %, 30 to 70% of $SnF_2$, 10 to 30% of $P_2O_5$, 10 to 40% of SnO, 0.1 to 10% of $SnO_2$, 0 to 5% of $In_2O_3$, 0 to 5% of $B_2O_3$, and 0 to 5% of $SiO_2$, and is thereby made to have a glass transition point [Tg] of 160° C. or lower and a softening point [Tf] of 180° C. or lower.

In the above glass composition, if the proportion of $SnF_2$ exceeds 70 mol %, stability as a glass decreases and the strength and the water resistance of the sealing glass layer become insufficient. Oppositely, if the proportion of $SnF_2$ is less than 30 mol %, low-temperature workability degrades and thermal expansivity increases as well due to increases in the glass transition point [Tg] and the softening point [Tf].

If the proportion of $P_2O_5$ exceeds 30 mol %, the water resistance of the sealing glass layer decreases significantly. Also, if the proportion of $P_2O_5$ is less than 10 mol %, the low-temperature workability degrades and the thermal expansivity increases as well due to increases in the glass transition point [Tg] and the softening point [Tf].

If the proportion of SnO exceeds 40 mol %, the low-temperature workability becomes insufficient due to increases in the glass transition point [Tg] and the softening point [Tf]. Oppositely, if the proportion of SnO is less than 10 mol %, the stability as a glass decreases and the strength and the water resistance of the sealing glass layer become insufficient.

Although the proportion of $SnO_2$ contributes to improvement of water resistance when it is 0.1 mol % or more, the thermal expansivity increases and thermal characteristics, such as the glass transition point, etc., are increased in excess of 10 mol %. $SnO_2$ is extremely high in softening point in comparison to SnO and although it was thus conventionally considered to be unsuitable for low-temperature melting as aimed at in the present invention, it became clear that detriment to low-temperature melting does not occur if its proportion with respect to SnO is adjusted.

Although $In_2O_3$ and $B_2O_3$ are components that improve the durability of glass, low-temperature workability degrades if each is present in excess of 5 mol %. Also, although $SiO_2$ is a component that contributes to low melting as well as to improvement of water resistance, the thermal expansivity increases if it is present in excess of 5 mol %.

And a more preferable glass composition of the present glass frit includes, in mol %, 40 to 65% of $SnF_2$, 15 to 30% of $P_2O_5$, 15 to 40% of SnO, 0.1 to 2% of $SnO_2$, 0 to 5% of $In_2O_3$, 0 to 5% of $B_2O_3$, and 0 to 5% of $SiO_2$.

With the glass composition of the present glass frit, various other oxide components may be included as necessary in small-amount ranges of 5 mol % or less each in addition to the six types of components of $SnF_2$, $P_2O_5$, SnO, $In_2O$, $B_2O_3$, and $SnO_2$. As such other oxide components, $Nb_2O_5$, $TiO_2$, BaO, $Ta_2O_5$, $Al_2O_3$, etc., can be cited.

Further, with the fluorinated tin-based glass frit of the present invention, it is required that a visible light transmission rate of a fired product obtained at 200° C. is 80% or more at a thickness of 0.6 mm and a rate of volume reduction of the fired product due to soaking in hot water at 85° C. for 24 hours is 2 vol. % or less. Also, in use as a sealing material, the glass frit should have a maximum particle size of 100 μm or less.

To manufacture a fluorinated tin-based glass frit such as the above, in accordance with routine procedure, first, a mixture of a glass raw material powder is placed in a container, such as an alumina crucible, etc., and this is vitrified by heating and melting for a predetermined time inside a heating furnace, such as an electric furnace, etc., and preferably, a manufacturing method of the present invention is adopted where the glass raw material powder is mixed with a powder of an aromatic carboxylic acid in advance and then vitrified.

That is, the method for manufacturing the fluorinated tin-based glass frit according to the present invention includes the steps of mixing the glass raw material powder, which includes 30 to 70 mol % of $SnF_2$, 10 to 30 mol % of $P_2O_5$, 10 to 40 mol % of SnO, 0.1 to 10 mol % of $SnO_2$, 0 to 5 mol % of $In_2O_3$, 0 to 5 mol % of $B_2O_3$, and 0 to 5 mol % of $SiO_2$, with the powder of the aromatic carboxylic acid, vitrifying the mixture by heating and melting it at 500° C. or lower, and thereafter pulverizing the mixture.

The glass frit that is thus obtained by mixing the glass raw material powder with the powder of the aromatic carboxylic acid and then vitrifying and pulverizing is super low melting to enable the firing temperature to be set to 200° C. or lower and is such that the sealing glass layer has high water resistance and transparency. Although the reason for this is not clear, it is considered that valence control of the essential components of SnO and $SnO_2$ has a favorable effect. That is, SnO is of the $Sn^{2+}$ ionization state and $SnO_2$ is of the $Sn^{4+}$ ionization state and it is assumed that stabilization is achieved by the $Sn^{2+}$ and $Sn^{4+}$ being co-present at an appropriate ratio. Although generally with each element included in glass, the ions are present at the same valence, there are very rare cases where stabilization is achieved with a state in which ions differing in valence are co-present as in the case of Sn. Also, although generally in a case where ions of different valences of the same element are present in glass, there is a tendency that destabilization occurs in a melting process, it is presumed that in the melting process of the glass raw material powder, the aromatic carboxylic acid acts as a reducing agent and a clarifying agent to improve the water resistance and transparency of the glass.

The above aromatic carboxylic acid is not restricted in particular and aromatic monocarboxylic acids, such as benzoic acid and salicylic acid, aromatic dicarboxylic acids, such as phthalic acid, isophthalic acid, and terephthalic acid, aromatic dicarboxylic acid anhydrides, such as phthalic anhydride, aromatic dicarboxylic acid alkyl esters, such as dimethyl terephthalate, etc., can be cited as suitable examples, and these may be used alone or two or more types may be used in combination.

As long as the amounts are appropriate, these aromatic carboxylic acids would, upon being mixed with the glass raw material powder, sublimate and dissipate completely in the melting process during vitrification and would not remain as carbides in the glass and therefore there is no concern of impairing the optical transparency of the sealing layer formed of the glass frit obtained. On the other hand, with other organic compounds, resins, carbon powder, etc., for which action as a reducing agent may be considered, it has been clarified that when mixed with the glass raw material powder and then heated and melted, the carbides thereof tend to remain in the glass to thereby impair the optical transparency of the sealing layer formed by firing the glass frit obtained and also become a cause of foaming during the firing.

An addition amount of the aromatic carboxylic acid is preferably in a range of 0.5 to 2.5 parts by weight with respect to 100 parts by weight of the glass raw material powder, and if the amount is too small, the action of improving the water resistance and the transparency of the sealing glass layer formed of the glass frit obtained would not be exhibited sufficiently, and if the amount is too great, the optical transparency of the sealing glass layer would rather decrease.

To obtain the glass frit from the vitrified melt, the melt is poured into and cooled in an appropriate mold, such as an alumina boat, etc., a glass block that is obtained is pulverized to an appropriate grain size by a pulverizer, and coarse particles are classified and removed. Although the grain size of the glass frit should be such that the maximum particle size is 100 μm or less as mentioned above, particularly for sealing of ultra-thin displays for small devices, it is recommended that the maximum particle size be 10 μm or less and more preferably 6 μm or less.

For the above pulverization, any of various pulverizers, such as a jet mill conventionally commonly used in glass frit manufacturing, etc., may be used, and particularly to obtain a fine grain size of 3 μm or less, it is advisable to employ wet pulverization. With the wet pulverization, pulverization is performed using a mill of media (balls) or beads, constituted of alumina or zirconia of 5 mm diameter or less, in an aqueous solvent like a water or alcohol aqueous solution, and although pulverization to finer size than jet mill pulverization is made possible, the glass composition that is the pulverized object is required to have high water resistance because the process is a fine pulverization process using an aqueous solvent, and the glass material of the present invention is suitable in this respect as well.

In addition to being used alone, the fluorinated tin-based glass frit of the present invention may take a form of a mixture mixed with a filler, such as a filling material or an aggregate. The mixing of such a filler decreases the thermal expansion coefficient of the sealing glass layer and by adjusting the mixing amount, the thermal expansivity of the sealing glass layer can thus be easily made to conform to the thermal expansivity of the objet to be sealed. Also, in the form of the mixture, the glass component serves as a binder that binds filler particles together during heating and melting and the sealing glass layer that is obtained thus becomes a sintered body of high strength and dense ceramic form.

The above filler suffices to be one that is higher in melting point than the glass component and is not melted at the firing temperature during processing and is not particularly restricted in type, and, for example, powders of zirconium silicate, cordierite, zirconium phosphate, β-eucryptite, β-spodumene, zircon, alumina, mullite, silica, β-quartz solid solution, zinc silicate, aluminum titanate, etc., are preferred. And it is advisable for the mixing amount of the filler to be in a range of ratio by weight of the glass powder to the filler of 50:50 to 99:1. If the mixing amount is too large, the fluidity during melting degrades and the binding force provided by the glass composition becomes insufficient such that a strong sintered body cannot be formed.

The fluorinated tin-based glass frit of the present invention or the mixed powder, in which the above-described filler is mixed with the glass frit, is generally dispersed at a high concentration in an organic binder solution and used as a paste that is subject to firing upon being coated on a portion to be sealed of the object to be sealed by screen printing etc., and may therefore made into a product of paste form in advance.

The organic binder solution used in the above paste is not restricted in particular but is preferably that with which the solvent vaporizes in a vicinity of the glass transition point, and examples include a solution, in which a binder component is dissolved in a medium or low boiling point solvent, such as acetone, ethanol, isopropyl alcohol, 2-methoxyethanol, thinner, or a mixed solvent of the above, and a solution, in which an acrylic-based resin binder is dissolved in a solvent, such as a ketone, an ester, or a low boiling point aromatic solvent, etc. And the viscosity of the paste is advisably in a range of 30 to 3000 dPa·s in terms of coating workability.

EXAMPLES

The present invention shall now be described specifically by way of examples. Raw material oxides used in the following were all special grade reagents made by Wako Pure Chemical Industries, Ltd. and special grade reagents were similarly used for other analytical reagents, etc., as well.

Manufacturing Examples 1 to 21

From each of mixtures, prepared by mixing respective powders of $SnF_2$, $SnO$, $P_2O_5$ (for which ammonium hydrogenphosphate was used), $SnO_2$, $In_2O_3$, $B_2O_3$, and $SiO_2$ as glass raw materials at the proportions (mol %) indicated in Tables 1 and 2 below, and mixtures, prepared by further adding and mixing terephthalic acid powder as the aromatic carboxylic acid at the proportions (weight %) indicated in the Tables 1 and 2 below to the above glass raw material powders, 10 g were weighed out, placed in an alumina crucible of 50 cc volume, and heated at 380 to 500° C. for 40 minutes inside a muffle furnace to melt, the melt was thereafter poured into an alumina port and recovered, and from the cooled glass bar, a glass rod of 4 mm square and 11 mm length was cut out and from the remaining portion, a glass frit of a particle size of 100 μm or less was manufactured by pulverizing and classifying with an automatic mortar.

Using the respective glass frits and glass rods manufactured by the above method, the glass transition point [Tg], the softening point [Tf], the thermal expansion coefficient [CTE], the color tone, the optical transparency, and the water resistance were examined. The results are shown in the Tables 1 and 2 below. The measurement methods of the respective items are as follows.

measured by an absorbance measuring instrument (tradename UV-1800 made by Shimadzu Corporation) and, from the result, the optical transparency was evaluated according to the following four stages.

◎ . . . Visible light transmission rate is 85% or more.

○ . . . Visible light transmission rate is 80% or more and less than 85%.

Δ . . . Visible light transmission rate is 50% or more and less than 80%.

× . . . Visible light transmission rate is less than 50%.

[Water Resistance]

Each of the above glass rods was soaked in 500 mL of hot water at 85° C. for 24 hours and a weight change from an initial weight was calculated by the following formula.

Weight change (%)=[1−measured weight (g)/initial weight (g)]×100

TABLE 1

| Glass frit No. | | 1 | 2 | 3 | 4 | 5 | 6 | 7 | 8 | 9 | 10 |
|---|---|---|---|---|---|---|---|---|---|---|---|
| Glass composition (mol %) | $SnF_2$ | 49.2 | 47.0 | 47.0 | 47.0 | 41.8 | 41.8 | 41.8 | 44.7 | 44.7 | 44.7 |
| | SnO | 26.3 | 25.1 | 25.1 | 25.1 | 36.8 | 36.8 | 36.8 | 30.8 | 30.8 | 30.8 |
| | $P_2O_5$ | 23.5 | 26.9 | 26.9 | 26.9 | 20.4 | 20.4 | 20.4 | 23.5 | 23.5 | 23.5 |
| | $SnO_2$ | 1.0 | 1.0 | 1.0 | 1.0 | 1.0 | 1.0 | 1.0 | 1.0 | 1.0 | 1.0 |
| Terephthalic acid (mol %) | | — | — | 1.0 | 3.0 | — | 1.0 | 2.0 | — | 1.0 | 2.0 |
| Glass transition point Tg (° C.) | | 136 | 141 | 144 | 145 | 152 | 153 | 152 | 143 | 141 | 140 |
| Softening point Tf (° C.) | | 156 | 166 | 167 | 171 | 165 | 166 | 167 | 157 | 155 | 158 |
| Thermal expansion coefficient ($\times 10^{-7}$/° C.) | | 168 | 163 | 160 | 163 | 159 | 158 | 157 | 160 | 162 | 161 |
| Color tone | | Transparent | Transparent | Transparent | Opaque | Transparent | Transparent | Transparent | Transparent | Transparent | Transparent |
| Optical transparency | | ○ | ○ | ◎ | X | ○ | ○ | ○ | ○ | ○ | ○ |
| Water resistance (weight change: %) | | −12.1 | −10.9 | −1.1 | −0.5 | −7.7 | −0.9 | −0.3 | −8.1 | −0.9 | −0.4 |

[Glass Transition Point and Softening Point]

Using α-alumina was used as a reference (standard sample), the glass transition point [Tg] and the softening point [Tf] of each glass frit were measured by a differential thermal analyzer (TG-8120, made by Rigaku Corporation) under the measuring conditions of a heating rate of 10° C./minute and a temperature range of 25° C. (room temperature) to 300° C.

[Thermal Expansion Coefficient]

The thermal expansion coefficient was measured by a thermal mechanical analyzer (TMA8310, made by Rigaku Corporation). For the measurement, the abovementioned glass rod was used as the measurement sample, the temperature was increased from room temperature to 100° C. at a rate of 10° C./minute, and an average thermal expansion coefficient a was determined. Also, quartz glass was used as a standard sample.

[Color Tone]

0.02±0.001 g of each of the abovementioned glass frits were weighed out, packed in a metal container of 5 mm diameter and 5 mm depth, increased in temperature to 200° C. at a rate of 10° C./minute, fired at that temperature for 5 minutes, and the fired product was taken out and its color tone was examined.

[Optical Transparency]

Required amounts of the above glass frits were increased in temperature to 200° C. at a rate of 10° C./minute and fired at that temperature for 5 minutes to prepare button-shaped molded samples of 30 mm diameter and 0.6 mm thickness, and for each molded sample, an absorbance of a visible light range (average value for wavelengths of 380 to 780 nm) was The results of Table 1 show that although the glass frits obtained in Manufacturing Examples 1, 2, 5, and 8 are such that the proportions of the respective components of $SnF_2$, SnO, $P_2O_5$, and $SnO_2$ are within the prescribed ranges of the present invention and therefore are extremely low in the glass transition point [Tg] and the softening point [Tf] and may thus be said to be super low melting such as to enable the firing temperature to be set to 200° C. or lower, these do not conform to the fluorinated tin-based glass frit of the present invention because the water resistance is extremely poor. On the other hand, the glass frit obtained in Manufacturing Example 3, with which the proportions of the respective components are the same as in Manufacturing Example 2, the glass frits obtained in Manufacturing Examples 6 and 7, with which the proportions of the respective components are the same as in Manufacturing Example 5, and the glass frits obtained in Manufacturing Examples 9 and 10, with which the proportions of the respective components are the same as in Manufacturing Example 8, are, due to respectively being vitrified upon mixing appropriate amounts of terephthalic acid, which is an aromatic carboxylic acid, to the glass raw materials, extremely low in the glass transition point [Tg] and the softening point [Tf] and thus super low melting and yet significantly improved in water resistance and high in optical transparency and conform to the fluorinated tin-based glass frit of the present invention. And, with the glass frit obtained in Manufacturing Example 4, although excellent water resistance is obtained, the mixing amount of terephthalic acid is too large with respect to the glass raw materials such that carbides remain in the glass to make the glass opaque and poor in optical transparency.

TABLE 2

| Glass frit No. | | 11 | 12 | 13 | 14 | 15 | 16 | 17 | 18 | 19 | 20 | 21 |
|---|---|---|---|---|---|---|---|---|---|---|---|---|
| Glass composition (mol %) | $SnF_2$ | 34.0 | 31.1 | 43.5 | 43.5 | 43.5 | 43.5 | 61.2 | 47.8 | 46.9 | 47.8 | 46.9 |
| | SnO | 48.7 | 44.4 | 33.4 | 33.1 | 33.1 | 32.4 | 18.7 | 25.4 | 24.9 | 25.4 | 24.9 |
| | $P_2O_5$ | 16.3 | 23.5 | 23.0 | 23.0 | 23.0 | 23.0 | 17.1 | 25.3 | 24.8 | 25.3 | 24.8 |
| | $SnO_2$ | 1.0 | 1.0 | — | 0.4 | 0.4 | 1.0 | 0.5 | 0.5 | 0.5 | 0.5 | 0.5 |
| | $In_2O_3$ | — | — | — | — | — | — | 0.6 | — | — | — | — |
| | $B_2O_3$ | — | — | — | — | — | — | 1.9 | — | — | 1.0 | 3.0 |
| | $SiO_2$ | — | — | — | — | — | — | — | 1.0 | 3.0 | — | — |
| Terephthalic acid (mol %) | | — | — | — | — | 1.0 | 1.0 | 1.0 | 1.0 | 1.0 | 1.0 | 1.0 |
| Glass transition point Tg (° C.) | | 202 | 171 | 139 | 136 | 137 | 138 | 130 | 138 | 141 | 137 | 144 |
| Softening point Tf (° C.) | | 214 | 188 | 151 | 153 | 144 | 145 | 144 | 146 | 155 | 149 | 158 |
| Thermal expansion coefficient (×$10^{-7}$/° C.) | | 148 | 149 | 160 | 162 | 160 | 159 | 165 | 158 | 154 | 159 | 153 |
| Color tone | | Transparent | Transparent | Transparent | Transparent | Transparent | Transparent | Transparent | Transparent | Transparent | Transparent | Transparent |
| Optical transparency | | ◯ | ◯ | ◯ | ◯ | ◯ | ◯ | ◯ | ◯ | ◯ | ◯ | ◯ |
| Water resistance (weight change: %) | | −5.2 | −5.6 | −5.3 | −3.0 | −0.9 | −0.6 | −0.9 | −0.7 | −0.3 | −0.7 | −0.4 |

The results of Table 2 show that with a glass composition where, as in the glass frits obtained in Manufacturing Examples 11 and 12, the proportion of SnO is made higher than that prescribed by the present invention and the proportions of $SnF_2$ and $P_2O_5$ are made relatively low, the water resistance, although slightly improved in comparison to Manufacturing Examples 1 and 2, is not satisfactory and the glass frits cannot be said to be super low melting because the glass transition point [Tg] and the softening point [Tf] are increased. Also, with a glass composition where, as in the glass frits obtained in Manufacturing Example 13, the proportions of the principal components of $SnF_2$, SnO, and $P_2O_5$ are within the prescribed ranges of the present invention but $SnO_2$ is not included, the glass frit is super low melting but poor in water resistance. On the other hand, the glass frits obtained in Manufacturing Examples 14 to 16, although being substantially the same as Manufacturing Example 13 in the proportions of the principal components, is super low melting and improved in water resistance due to including an appropriate amount of $SnO_2$. However, the glass frit of Manufacturing Example 14 is insufficient in water resistance in comparison to the glass frits of Manufacturing Examples 15 and 16 that were vitrified upon mixing appropriate amounts of terephthalic acid to the glass raw materials. On the other hand, a glass frit, which, as with the glass frits obtained in Manufacturing Examples 17 to 21, is arranged with a glass composition where the proportions of the respective components of $SnF_2$, SnO, $P_2O_5$, and $SnO_2$ are within the prescribed ranges of the present invention and one type or two types among $In_2O_3$, $B_2O_3$, and $SiO_2$ is or are added at appropriate amount or amounts as an optional component and is vitrified upon mixing an appropriate amount of terephthalic acid to the glass raw materials, is super low melting and yet significantly improved in water resistance and conforms to the fluorinated tin-based glass frit of the present invention.

Manufacturing Examples 22 to 23

From each of mixtures, prepared by adding and mixing, besides terephthalic acid, the various additives indicated in Table 3 below at the proportions (weight %) indicated in the Table to the glass raw material powders of Manufacturing Example 2, 10 g were weighed out and, as in Manufacturing Examples 1 to 21 above, heated, melted, and recovered, and from the cooled glass bar, the same glass rod and glass frit as the above were manufactured. Using the respective glass frits and glass rods, the glass transition point [Tg], the softening point [Tf], the thermal expansion coefficient [CTE], the color tone, the optical transparency, and the water resistance were examined in the same manner as with Manufacturing Examples 1 to 21 above. The results are shown in the Table 3 below. With Manufacturing Examples 29 to 32, the recovered glass bars were opaque due to containing carbides and were thus judged to be of poor quality and measurements of the respective glass characteristics were omitted.

TABLE 3

| Glass frit No. | | 22 | 23 | 24 | 25 | 26 | 27 | 28 | 29 | 30 | 31 | 32 |
|---|---|---|---|---|---|---|---|---|---|---|---|---|
| Glass composition (mol %) | $SnF_2$ | 47.0 | 47.0 | 47.0 | 47.0 | 47.0 | 47.0 | 47.0 | 47.0 | 47.0 | 47.0 | 47.0 |
| | SnO | 25.1 | 25.1 | 25.1 | 25.1 | 25.1 | 25.1 | 25.1 | 25.1 | 25.1 | 25.1 | 25.1 |
| | $P_2O_5$ | 26.9 | 26.9 | 26.9 | 26.9 | 26.9 | 26.9 | 26.9 | 26.9 | 26.9 | 26.9 | 26.9 |
| | $SnO_2$ | 1.0 | 1.0 | 1.0 | 1.0 | 1.0 | 1.0 | 1.0 | 1.0 | 1.0 | 1.0 | 1.0 |
| Additive (weight %) | Salicylic acid | 1.0 | 3.0 | — | — | 1.0 | — | 1.0 | — | — | — | — |
| | Phthalic acid | — | — | 1.0 | 3.0 | — | 1.0 | 1.0 | — | — | — | — |
| | Terephthalic acid | — | — | — | — | 1.0 | 1.0 | — | — | — | — | — |
| | Cellulose resin | — | — | — | — | — | — | — | 1.0 | — | — | — |
| | Acrylic resin | — | — | — | — | — | — | — | — | 1.0 | — | — |
| | Sucrose | — | — | — | — | — | — | — | — | — | 1.0 | — |
| | Carbon powder | — | — | — | — | — | — | — | — | — | — | 1.0 |
| Recovery state when vitrified | | ◯ | ◯ | ◯ | ◯ | ◯ | ◯ | ◯ | X | X | X | X |
| Glass transition point Tg (° C.) | | 146 | 138 | 142 | 141 | 145 | 139 | 138 | — | — | — | — |

TABLE 3-continued

| Glass frit No. | 22 | 23 | 24 | 25 | 26 | 27 | 28 | 29 | 30 | 31 | 32 |
|---|---|---|---|---|---|---|---|---|---|---|---|
| Softening point Tf (° C.) | 166 | 169 | 165 | 160 | 165 | 158 | 155 | — | — | — | — |
| Thermal expansion coefficient ($\times 10^{-7}$/° C.) | 158 | 165 | 160 | 161 | 164 | 155 | 167 | — | — | — | — |
| Color tone | Transparent | Transparent | Transparent | Transparent | Transparent | Transparent | Transparent | — | — | — | — |
| Optical transparency | ○ | Δ | ○ | Δ | ○ | ○ | ○ | — | — | — | — |
| Water resistance (weight change: %) | −1.6 | −0.7 | −2.0 | −0.9 | −0.5 | −0.3 | −0.4 | — | — | — | — |

From the results of Table 3, it is clear that even in cases where, as in Manufacturing Examples 22, 24, and 26 to 28, salicylic acid or phthalic acid is used as the aromatic carboxylic acid added to the glass raw materials or these acids are used in combination with terephthalic acid, glass frits that conform to the fluorinated tin-based glass frit of the present invention and are super low melting and yet excellent in optical transparency and water resistance are obtained. On the other hand, it can be understood that when, as in Manufacturing Examples 29 to 32, a cellulose resin, acrylic resin, sucrose, or carbon powder, etc., with which action as a reducing agent may be considered, is used in place of an aromatic carboxylic acid, opaque glass of poor quality is formed due to remaining of carbides of these substances. Also, as in Manufacturing Examples 23 and 25, even in a case where salicylic acid or phthalic acid is used, the optical transparency degrades if the mixing amount is too large.

The invention claimed is:

1. A method for manufacturing a fluorinated tin-based glass frit comprising the steps of mixing a glass raw material powder, which includes, in mol %, 30 to 70% of SnF2, 10 to 30% of P2O5, 10 to 40% of SnO, 0.1 to 10% of SnO2, 0 to 5% of In2O3, 0 to 5% of B2O3, and 0 to 5% of SiO2, with a powder of an aromatic carboxylic acid, vitrifying the mixture by heating and melting it at 500° C. or lower, and thereafter pulverizing the mixture.

2. The method for manufacturing the fluorinated tin-based glass frit according to claim 1, wherein 100 parts by weight of the glass raw material powder is mixed with 0.5 to 2.5 parts by weight of the powder of the aromatic carboxylic acid.

3. The method for manufacturing the fluorinated tin-based glass frit according to claim 1, wherein the aromatic carboxylic acid is at least one type selected from among an aromatic monocarboxylic acid, an aromatic dicarboxylic acid, an aromatic dicarboxylic acid anhydride, and a mono or dialkyl ester of an aromatic dicarboxylic acid.

4. The method for manufacturing the fluorinated tin-based glass frit according to claim 1, wherein the glass frit has a glass transition point of 160° C. or lower, and a softening point of 180° C. or lower.

5. The method for manufacturing the fluorinated tin-based glass frit according to claim 1, comprising the glass raw material powder including, in mol %, 40 to 65% of SnF2, 15 to 30% of P2O5, 15 to 40% of SnO, 0.1 to 2% of SnO2, 0 to 5% of In2O3, 0 to 5% of B2O3, and 0 to 5% of SiO2.

* * * * *